United States Patent
Ursin et al.

(10) Patent No.: US 9,354,344 B2
(45) Date of Patent: May 31, 2016

(54) INTERFACING MARINE SURVEY DEVICES USING ACOUSTIC TRANSDUCERS

(71) Applicant: PGS Geophysical AS, Lysaker (NO)

(72) Inventors: Torbjørn Ursin, Oslo (NO); Michael Malling, Oslo (NO)

(73) Assignee: PGS Geophysical AS, Oslo (NO)

( * ) Notice: Subject to any disclaimer, the term of this patent is extended or adjusted under 35 U.S.C. 154(b) by 556 days.

(21) Appl. No.: 13/831,112

(22) Filed: Mar. 14, 2013

(65) Prior Publication Data

US 2014/0269168 A1    Sep. 18, 2014

(51) Int. Cl.
G01V 1/38    (2006.01)
G01V 1/22    (2006.01)

(52) U.S. Cl.
CPC ............... G01V 1/3808 (2013.01); G01V 1/22 (2013.01)

(58) Field of Classification Search
CPC .............................. G01V 1/3808; G01V 1/22
USPC ............................ 367/15, 117, 133, 134, 197
See application file for complete search history.

(56) References Cited

U.S. PATENT DOCUMENTS

| | | | | |
|---|---|---|---|---|
| 4,033,278 A | * | 7/1977 | Waters ................. | G01V 1/3826 114/245 |
| 4,617,518 A | | 10/1986 | Srnka | |
| 5,497,356 A | * | 3/1996 | Norton, Jr. ........... | G01V 1/3835 367/130 |
| 5,652,735 A | | 7/1997 | Johansen et al. | |
| 5,805,080 A | | 9/1998 | Lemoine et al. | |
| 7,319,411 B2 | * | 1/2008 | Ong ....................... | G08C 19/04 340/870.11 |
| 7,660,189 B2 | * | 2/2010 | Vigen .................. | G01V 1/3835 367/106 |
| 2008/0161660 A1 | | 7/2008 | Arneson et al. | |
| 2009/0245019 A1 | * | 10/2009 | Falkenberg .......... | G01V 1/3835 367/17 |
| 2010/0061187 A1 | | 11/2010 | Sodal | |

FOREIGN PATENT DOCUMENTS

| | | | | |
|---|---|---|---|---|
| EP | 0154968 A2 | * | 9/1985 | ........... G01V 1/3808 |
| EP | 1812778 | | 8/2007 | |

OTHER PUBLICATIONS

Benson, B., Li, Y., Kastner, R,; Faunce, B., Domond, K., Kimball, D., Schurgers, C., "Design of a Low-Cost, Underwater Acoustic Modem for Short-Range Sensor Networks," OCEANS 2010 IEEE, May 2010, pp. 1-9, 24-27.

* cited by examiner

*Primary Examiner* — Daniel L Murphy
(74) *Attorney, Agent, or Firm* — Meyertons, Hood, Kivlin, Kowert & Goetzel, P.C.

(57) ABSTRACT

Techniques are disclosed relating to acoustically interfacing marine survey devices. In one embodiment, a system includes survey equipment, first and second acoustic transducers, and a first device. In this embodiment, the first acoustic transducer is coupled to the survey equipment and configured to perform at least one of receiving survey information and sending control information. In this embodiment, the first device is not directly coupled to the survey equipment. In this embodiment, the second acoustic transducer is coupled to the first device and configured to perform at least one of sending survey information and receiving control information. In one embodiment, the first acoustic transducer is included in or coupled to a streamer cable.

17 Claims, 5 Drawing Sheets

INTERFACING MARINE SURVEY DEVICES USING ACOUSTIC TRANSDUCERS

BACKGROUND

Marine geophysical surveys are often used for oil and gas exploration in marine environments. Various types of signal sources and sensors may be used in different types of geophysical surveys. For example, one type of marine geophysical survey is based on the use of pressure waves. In such a survey, a vessel may tow an acoustic source (e.g., an air gun or a marine vibrator) and a plurality of streamers along which a number of pressure sensors (e.g., hydrophones) are located. Pressure waves generated by the source may then be transmitted to the earth's crust and then reflected back and captured at the sensors. Pressure waves received during a marine seismic survey may be analyzed to locate hydrocarbon-bearing geological structures, and thus determine where deposits of oil and natural gas may be located. As another example, marine electromagnetic (EM) surveys may be conducted using EM signals transmitted by a submerged antenna and detected by EM receivers.

Various types of sensors, controllers, and other devices are often used in marine geophysical surveys and may be towed behind one or more survey vessels. Interfacing such devices (e.g., through wiring and inductive coils) in order to communicate with survey equipment on the survey vessels may be complicated and costly.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

DETAILED DESCRIPTION

The present disclosure describes embodiments in which marine survey devices are configured to communicate with survey equipment via an acoustic interface. Marine survey systems typically include acoustic transceivers for range determination. Using these transceivers (and/or other acoustic transceivers) to interface with other devices may eliminate the need for separate interfaces (e.g., wiring and communication coils) for the other sensors/devices. This may reduce the cost and complexity of survey systems and improve surveying efficiency and safety. Also, acoustic transceivers may have a greater communications range than other types of interfaces.

Figure 1:
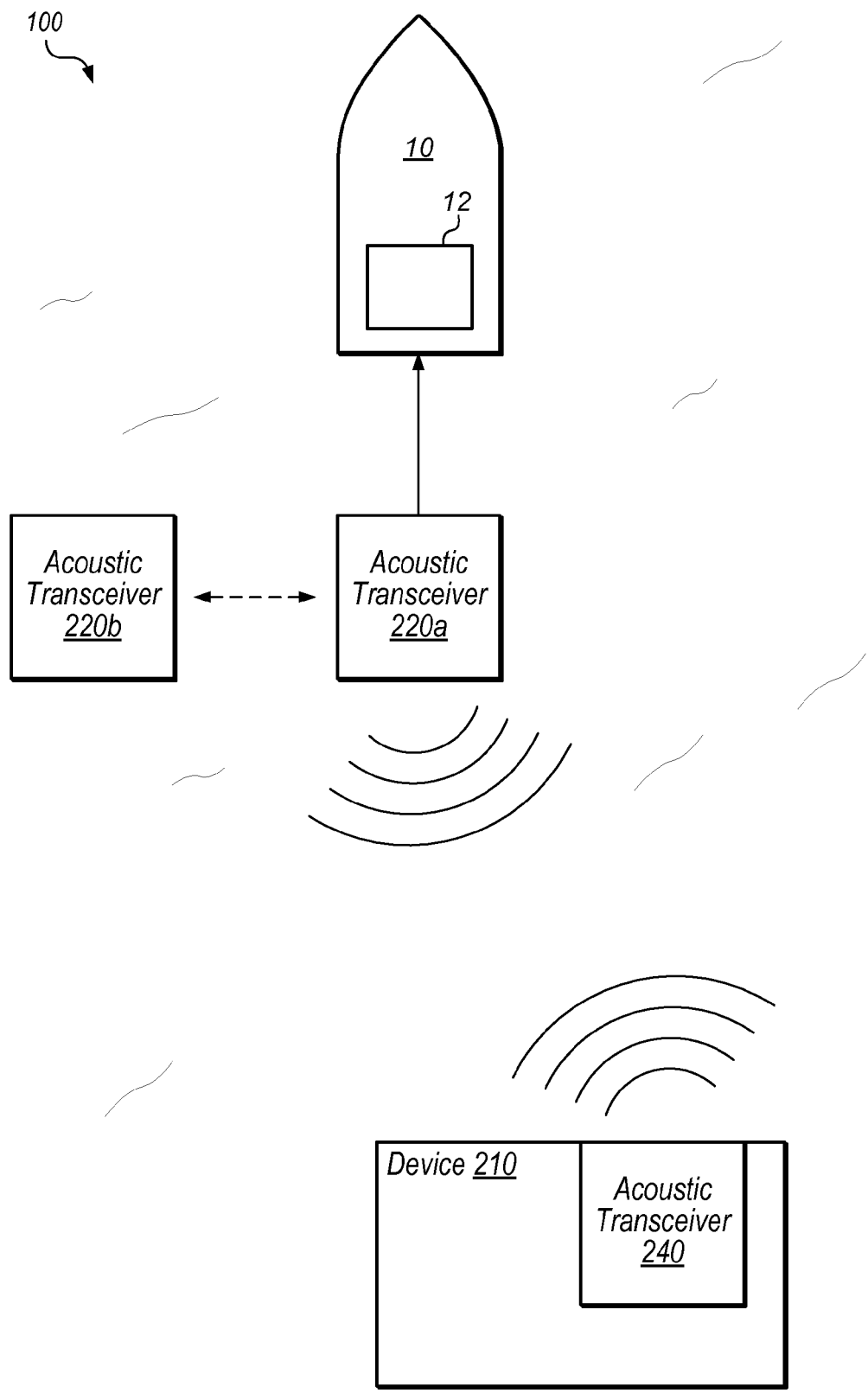
FIG. 1 is a block diagram illustrating one embodiment of a marine survey system that includes an acoustic transducer interface.

Referring now to FIG. 1, one embodiment of a system 100 that includes an acoustic transducer interface is shown. In the illustrated embodiment, system 100 includes vessel 10, acoustic transceivers 220a and 220b, and device 210, which in turn includes acoustic transceiver 240. In the illustrated embodiment, vessel 10 travels along the surface of a body of water and includes survey equipment 12.

Acoustic transceivers 220 may be towed behind vessel 10 or may be coupled to the hull of vessel 10. Acoustic transceivers 220 may be included in or coupled to a source cable or streamer cable, as will be described below in further detail with respect to FIG. 2. In one embodiment, acoustic transceivers 220 are configured to determine relative distance between transceiver 220a and transceiver 220b. Acoustic transceivers 220 may be configured to determine this relative distance periodically and communicate the distance to survey equipment 12. In other embodiments, acoustic transceiver 220a is not used as a range-finding device, but is dedicated to interfacing with one or more devices such as device 210.

Acoustic transceiver 220a may be configured to communicate with survey equipment 12 using various interfaces. In one embodiment, acoustic transceiver 220a is directly wired to survey equipment 12, e.g., via the streamer 20 and lead-in cable 18 of FIG. 2. In some embodiments, the interface includes inductive communication coils attached to a dedicated wire pair. In other embodiments, the interface may include an optic fiber or radio frequency interface. In still other embodiments, any appropriate interface may be implemented.

As used herein, the term "acoustic transducer" includes its well-known meaning in the art and refers to a device configured to convert pressure wave vibrations into other types of energy (e.g., mechanical or electrical) and/or convert other types of energy into pressure wave vibrations. The term "acoustic signal" is not limited to audible sound waves, but includes pressure waves at any of various frequencies. For example, in one embodiment, acoustic transceivers may communicate using acoustic signals with a frequency of about 23 kilohertz, while the range of audible pressure wave frequencies is only about 20 hertz to 20 kilohertz. Acoustic transducers may convey information on an acoustic signal using various modulation techniques. Acoustic transducers may also be used to determine distance by measuring the time taken for an acoustic signal to travel through a medium (e.g., water). A transducer that sends a signal may be referred to as an "actuator" while a transducer that receives a signal may be referred to as a "sensor." An acoustic transducer may be configured as both an actuator and a sensor, and such a transducer may be referred to as an "acoustic transceiver."

In the illustrated embodiment, device 210 is configured to communicate with survey equipment 12 via acoustic transceiver 220a using acoustic transceiver 240. In some embodiments, device 210 is one of various types of sensors such as: a velocimeter, a temperature sensor, a heading sensor, a position sensor, a pressure sensor, a seismic sensor, an electromagnetic sensor, or a range sensor, for example. In these embodiments, device 210 is configured to send information associated with a marine environment being surveyed (referred to as "survey information") to survey equipment 12 and/or receive control information from survey equipment 12.

In some embodiments device 210 is configured to perform various survey actions. For example, device 210 may be a deflector, a control device (e.g., streamer control device 26 described below), or a signal source. In these embodiments, device 210 is configured to send and/or receive various control information to/from survey equipment 12. In various embodiments, device 210 may be any survey device that is configured to interface with survey equipment 12 and/or another survey device.

As used herein, the term "control information" refers to information communicated in order to control or alter some operation of a survey device. Control information may include command information, request information, handshake/acknowledgement information, and/or firmware updates, for example. Further "information associated with a marine environment being surveyed" or "geophysical information" refers to information gathered from various sensors (e.g., geophysical responses) as well as various information associated with survey equipment state (e.g., the geodetic location of equipment, remaining battery life, operational state, etc.).

A "survey action" refers to any action performed by a survey device in the course of a marine survey. Examples of survey actions include, but are not limited to: acquiring data from a sensor, changing the angle of a deflector, entering a particular operational mode, reporting a current operational state, reporting an error, emitting a survey source signal, and updating device firmware.

In some embodiments, device 210 may be configured to send information but not receive information and may include an acoustic actuator instead of acoustic transceiver 240. In yet other embodiments, device 210 may be configured to receive information but not send information and may include an acoustic sensor instead of acoustic transceiver 240. However, in some embodiments, two-way communication is preferred, e.g., to improve communication reliability by sending acknowledgement signals.

Figure 2:
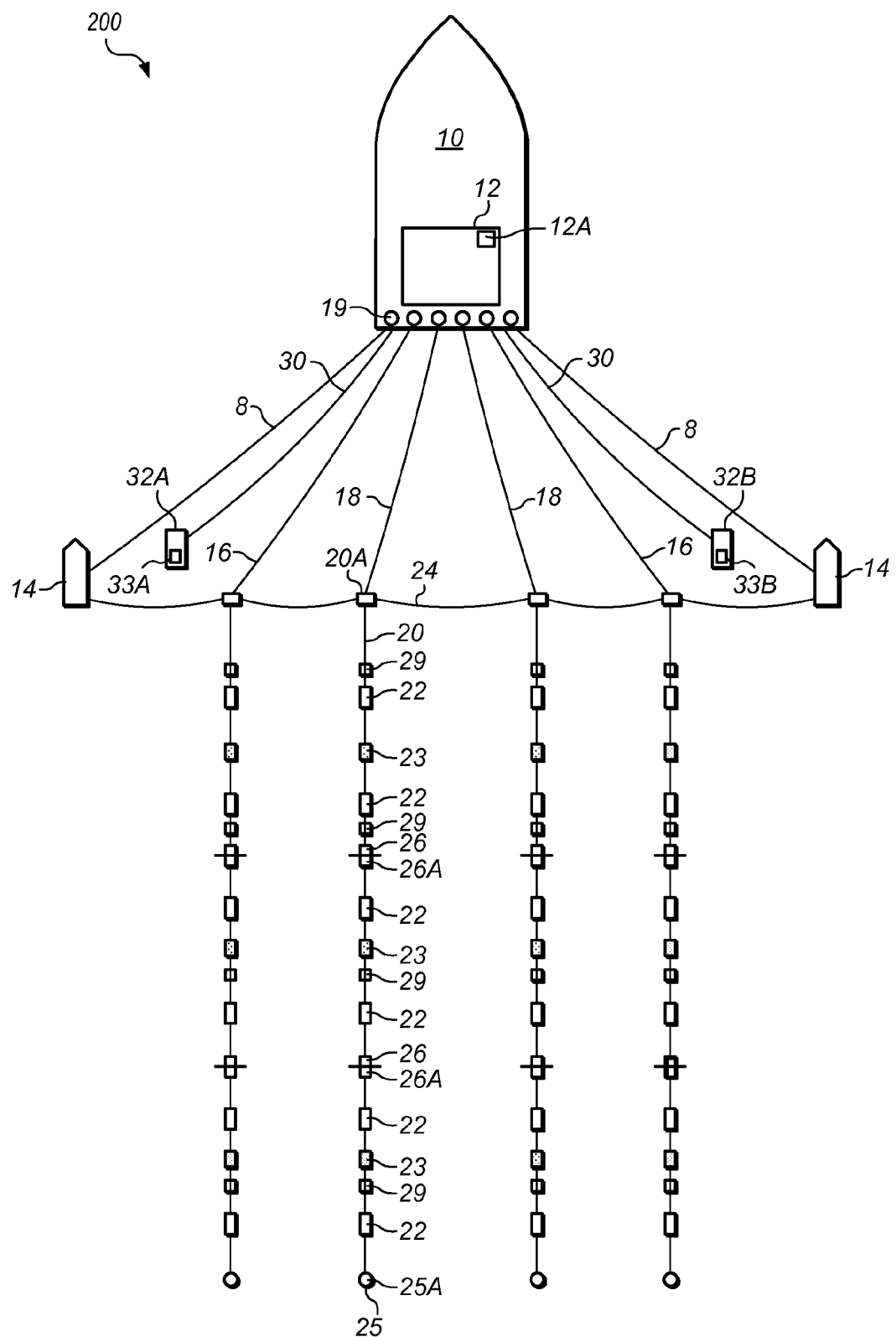
FIG. 2 is a diagram illustrating a more detailed embodiment of a marine survey system.

Referring to FIG. 2, a diagram shows one embodiment of a marine geophysical survey system 200. System 200 includes survey vessel 10 that moves along the surface of a body of water such as a lake or the ocean. In the illustrated embodiment, survey vessel 10 is configured to tow streamers 20, signal sources 32, and paravanes 14. Survey vessel 10 may include equipment, shown generally at 12 and for convenience collectively referred to as "survey equipment." Survey equipment 12 typically includes devices such as a recording unit (not shown separately) for making a record with respect to time of signals generated by various sensors in the acquisition system. Survey equipment 12 also typically includes navigation equipment (not shown separately), which may be configured to control, determine, and record, at selected times, the geodetic positions of survey devices. Geodetic position may be determined using various devices, including global navigation satellite systems such as the global positioning system (GPS), for example. In the illustrated embodiment, vessel 10 includes geodetic positioning device 12A.

Signal sources 32A and 32B may be any type of signal source known in the art and may be referred to collectively as signal sources 32. As used herein, the term "signal source" refers to an apparatus that is configured to emit a signal (e.g., acoustic, electromagnetic, etc.) that is reflected or refracted from one or more underlying structures and then measured. Each signal source 32 may include an array of multiple signal sources. For example, signal source 32A may include a plurality of air guns. Thus the term "signal source" may refer to a single signal source or a module that includes a plurality of signal sources. In various embodiments, system 200 may include any appropriate number of towed signal sources 32. In the illustrated embodiment, signal sources 32 are each coupled to survey vessel 10 at one end through winch 19 or a similar spooling device that enables changing the deployed length of each signal source cable 30.

In the illustrated embodiment, streamers 20 each include multiple geophysical sensors 22 for receiving geophysical responses. As used herein, the term "streamer" includes its well-known meaning in the art refers to an apparatus that includes detectors, sensors, receivers, or other structures configured to measure the reflected signal (e.g., by using hydrophones, electrodes, etc. that are positioned along or in proximity to the streamer). Geophysical sensors 22 may be any type of geophysical sensor known in the art. Non-limiting examples of such sensors may include particle-motion-responsive seismic sensors such as geophones and accelerometers, pressure-responsive seismic sensors, pressure-time-gradient-responsive seismic sensors, electrodes, magnetometers, temperature sensors or combinations of the foregoing. In various implementations of the disclosure, geophysical sensors 22 may measure geophysical responses, for example, seismic or electromagnetic field energy primarily reflected from or refracted by various structures in the Earth's subsurface below the bottom of a body of water in response to energy imparted into the subsurface by one or more of signal sources 32. Seismic energy, for example, may originate from signal sources 32, or an array of such sources, deployed in a body of water and towed by survey vessel 10. Electromagnetic energy may be provided by passing electric current through a wire loop or electrode pair (not shown for clarity). Survey equipment 12 may include control equipment for selectively operating and maneuvering signal sources 32 and/or streamers 20. Other embodiments may include a second survey vessel (not shown) configured to tow signal sources and/or streamers. Survey vessel 10 may tow only signal sources 32 or only streamers 20. Although illustrated with two signal sources 32 and four streamers 20, survey vessel 10 may tow any appropriate number of signal sources 32 and streamers 20.

In some embodiments, streamers 20 and/or signal sources 32 are configured to communicate with survey equipment 12 via an acoustic interface as described above with reference to FIG. 1. An acoustic transducer for such an interface may be coupled to vessel 10 or towed behind vessel 10 (e.g., the transducer may be included in or coupled to a streamer 20).

In the illustrated embodiment, survey vessel 10 tows four sensor streamers 20. In other embodiments, vessel 10 may tow any appropriate number of sensor streamers. In marine geophysical acquisition systems such as shown in FIG. 2 that include a plurality of laterally spaced-apart streamers, streamers 20 are typically coupled to towing equipment that secures the forward end of each of streamers 20 at a selected lateral position with respect to adjacent streamers and with respect to survey vessel 10. As shown in FIG. 2, the towing equipment may include two paravanes 14 coupled to survey vessel 10 via paravane tow ropes 8. In the illustrated embodiment, paravanes 14 are the outermost components in the streamer spread and are used to provide streamer separation.

In the illustrated embodiment, paravane tow ropes 8 are each coupled to survey vessel 10 at one end through winch 19 or a similar spooling device that enables changing the deployed length of each paravane tow rope 8. In the embodiment shown, the distal end of each paravane tow rope 8 is coupled to paravanes 14. Paravanes 14 are each shaped to provide a lateral component of motion to the various components deployed in a body of water when towed. The lateral motion component of each paravane 14 is opposed to that of the other paravane 14. The combined lateral motion component of paravanes 14 separates paravanes 14 from each other until they put into tension one or more spreader ropes or cables 24, coupled end to end between paravanes 14. Paravanes 14 may provide active or passive lateral force and/or depth control. When actively controlled, paravanes 14 may receive control signals from survey equipment 12. Paravanes 14 may be configured to communicate with survey equipment 12 via an acoustic interface as described above with reference to FIG. 1.

Streamers 20 may each be coupled, at the axial end thereof nearest survey vessel 10 (the "forward end"), to respective lead-in cable terminations 20A. Lead-in cable terminations 20A may be coupled to or associated with spreader ropes or cables 24 so as to fix the lateral positions of streamers 20 with respect to each other and with respect to the centerline of survey vessel 10. Electrical, optical, and/or any other suitable connection between the appropriate components in survey equipment 12 and, ultimately, geophysical sensors 22 (and/or other circuitry) in the ones of streamers 20 inward of the lateral edges of the system may be made using inner lead-in cables 18, each of which terminates in respective lead-in cable termination 20A. Geophysical sensors 22 may be configured to communicate with survey equipment 12 via an acoustic interface as described above with reference to FIG. 1. Lead-in termination 20A is disposed at the forward end of each streamer 20. Corresponding electrical, optical, and/or other suitable connection between the appropriate components of survey equipment 12 and geophysical sensors 22 in the laterally outermost streamers 20 may be made through respective lead-in terminations 20A, using outermost lead-in cables 16. Each of innermost lead-in cables 18 and outermost lead-in cables 16 may be deployed by respective winches 19 or similar spooling devices such that the deployed length of each cable 16, 18 may be changed. The type of towing equipment coupled to the forward end of each streamer shown in FIG. 2 is only intended to illustrate a type of equipment that can tow an array of laterally spaced-apart streamers in the water. Other towing structures may be used in other examples of geophysical acquisition system according to the present disclosure.

Each streamer 20 may include streamer control devices 26 which may impart forces to the streamer in selected directions. Each streamer control device 26 may include one or more rotatable control surfaces that when moved to a selected rotary orientation with respect to the direction of movement the water creates a hydrodynamic lift in a selected direction to urge streamer 20 in a selected direction. Thus, such streamer control devices 26 may be used to maintain streamers 20 in a selected orientation. Streamer control devices 26 may be configured to communicate with survey equipment 12 and/or other survey devices using an acoustic interface.

Streamers 20 may include a plurality of heading sensors 29 disposed at spaced-apart positions along each streamer 20. Heading sensors 29 may be geomagnetic direction sensors such as magnetic compass devices affixed to the exterior of streamer 20. Heading sensors 29 provide a signal indicative of the heading (direction with respect to magnetic north) of streamer 20 at the axial position of heading sensor 29 along the respective streamer. Measurements of such heading at spaced-apart locations along each streamer may be used to interpolate the orientation (including the spatial distribution) of each streamer. Heading sensors 29 may be configured to communicate with survey equipment 12 and/or other survey devices using an acoustic interface.

Each streamer 20 may include a tail buoy 25 at the distal end of the streamer. Tail buoy 25 may include, among other sensing devices, geodetic position receiver 25A such as a GPS receiver that may determine the geodetic position of each tail buoy 25. The geodetic position receiver 25A in each tail buoy 25 may be in signal communication with survey equipment 12. Each tail buoy 25 may be configured to communicate with survey equipment 12 and/or other survey devices using an acoustic interface.

In one embodiment, position determination devices may be associated with streamer control devices 26 and/or other locations along streamers 20. In one example, the position determination device may be an acoustic range sensing device ("ARD") 26A/23. Such ARDs typically include an ultrasonic transceiver and/or transmitter and electronic circuitry configured to cause the transceiver to emit pulses of acoustic energy. Travel time of the acoustic energy between a transmitter and a receiver disposed at a spaced-apart position such as along the same streamer and/or on a different streamer, is related to the distance between the transmitter and a receiver, and the acoustic velocity of the water. The acoustic velocity may be assumed not to change substantially during a survey, or it may be measured by a device such as a water velocity test cell. Alternatively or additionally, ARDs may be disposed at selected positions along each one of the streamers not co-located with the lateral control devices 26. Such ARDs are shown at 23 in FIG. 2. Each ARD 26A, 23 may be in signal communication with survey equipment 12 such that at any moment in time the distance between any two ARDs 26A, 23 on any streamer 20 is determinable. One or more ARDs may be placed at selected positions proximate the rear end of survey vessel 10 so that relative distances between the selected positions on survey vessel 10 and any of the ARDs on the streamers may also be determined. The ARD's 26A, 23 may be included in streamer 20 (referred to as "inline" elements) or may be coupled to streamer 20.

In some embodiments, ARD's 26A, 23 and/or other acoustic transducers may communicate acoustically with other devices of system 200 that include acoustic transducers. This may allow the other devices to communicate with survey equipment 12 via an acoustic interface, which may reduce complexity in system 200, e.g. by re-using the interface between survey equipment 12 and acoustic transceivers for communication with other devices.

The acoustic transducers and the survey devices described herein may be included in or coupled to various elements of system 200. In other embodiments, a survey system may include other elements, such as other vessels, streamers, platforms, buoys, moored modules, etc. In these embodiments, acoustic transducers, survey devices, and survey equipment may be coupled to and/or towed behind any of various such elements in a survey system.

Figure 3:
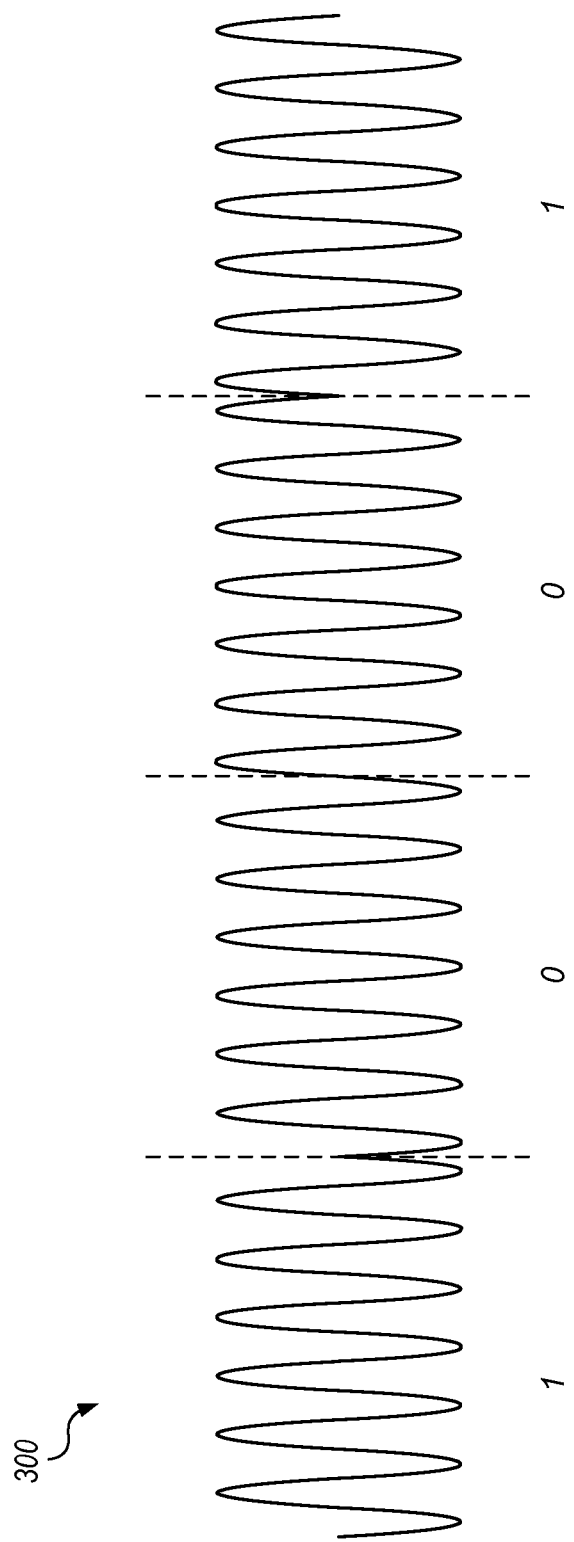
FIG. 3 is an idealized diagram illustrating one embodiment of a portion of an acoustic signal.

Referring now to FIG. 3, an idealized diagram shows one embodiment of a portion of an acoustic signal 300. Methods for transmitting information by modulating it on an acoustic wave are well-known in the art. In the illustrated embodiment, signal 300 uses an acoustic carrier wave (e.g., a sine wave) to convey information. In the illustrated embodiment, information is conveyed by modulating between two phases that are separated by 180 degrees. For example, a digital '1' may be represented by a phase of 0 degrees and a digital '0' may be represented by a phase of 180 degrees. This may be referred to as binary phase-shift keying (BPSK), one flavor of phase-shift keying (PSK). In the illustrated embodiment, signal portion 300 conveys four bits of information: '1-0-0-1'. Note that each bit corresponds to a portion of signal 300 and that the phase changes when the bit value changes. For example, when changing from '1' to '0', the phase changes. However, when a bit value does not change (e.g., for the consecutive 0's) the phase does not change.

In one type of PSK, a receiver has access to a reference signal in order to compare a received phase to a reference phase. In another type, referred to as differential PSK, the receiver determines the phase of the received signal relative to itself. For example, the receiver may keep track of changes in phase and use that information to time demodulation of the remainder of the signal. Differential PSK may be simple to implement, but may introduce demodulation errors in strings of bits with few bit changes. However, bits may be encoded or compressed before being transmitted in order to ensure a particular number of bit changes in each string of bits. In some embodiments, acoustic receivers/transceivers described herein are configured to use differential PSK. In general, the communications rate when using an acoustic signal depends on the frequency of the acoustic carrier wave.

In some embodiments, various acoustic transceivers described herein may operate at various different acoustic frequencies and may identify other transceivers based on frequency. In other embodiments, transceivers may broadcast identification information encoded on acoustic signals in order to identify each other. Thus, a single acoustic transceiver may reliably send and/or receive information to/from multiple other acoustic transceivers.

In some embodiments, other types of phase-shift keying may be implemented, including quadrature phase-shift keying or even higher-order phase-shift keying that utilizes a greater number of different phases. In other embodiments, other types of modulation may be implemented, such as various types of frequency-shift keying or amplitude-shift keying, for example.

Figure 4:
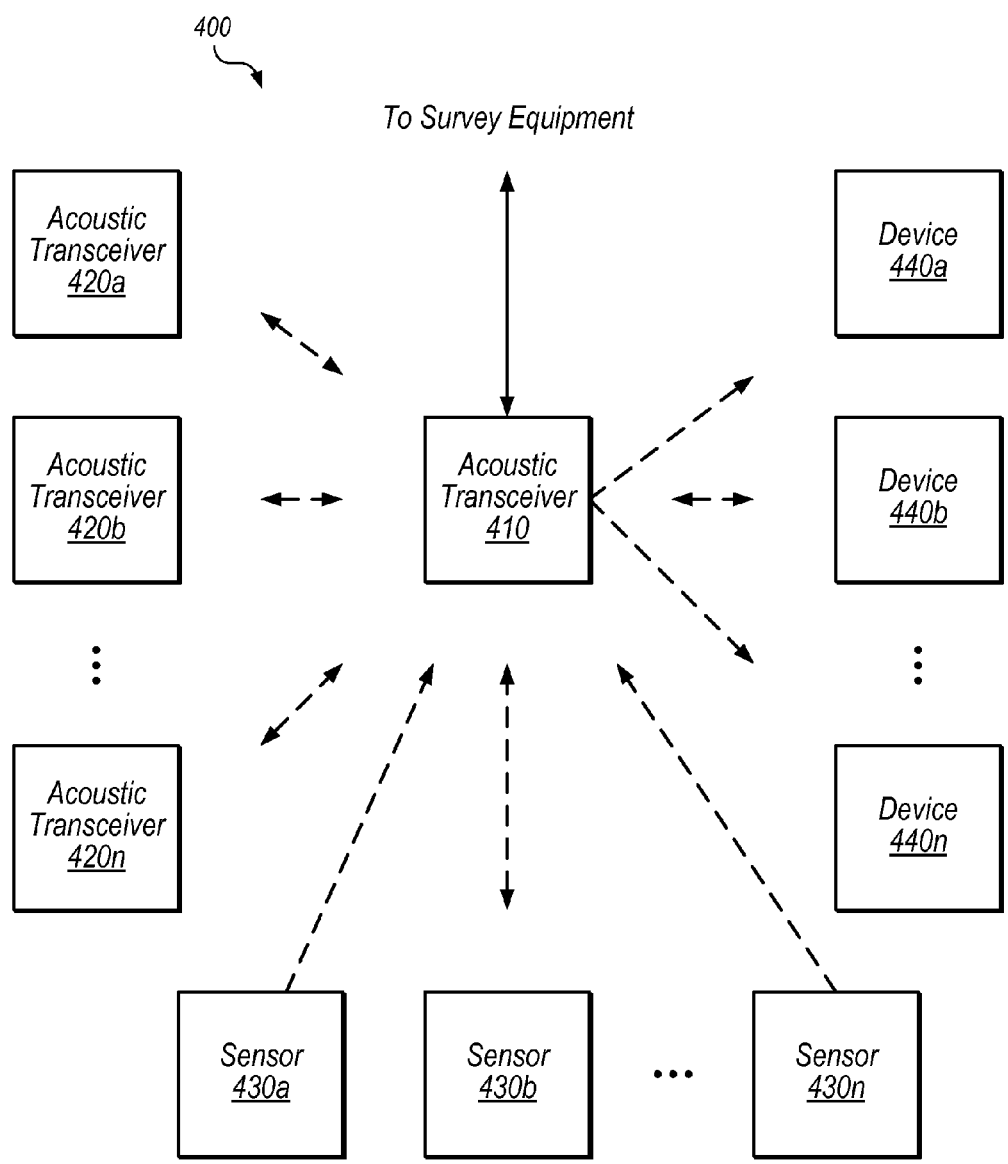
FIG. 4 is a block diagram illustrating another embodiment of a survey system.

Referring now to FIG. 4, a block diagram illustrating one embodiment of a survey system 400 is shown. In the illustrated embodiment, acoustic transceiver 410 is configured to send and/or receive acoustic signals from acoustic transceivers 420a-n, sensors 430a-n and devices 440a-n. The dashed lines in FIG. 4 represent acoustic signals.

For example, acoustic transceiver 410 may be configured to determine ranges between acoustic transceiver 410 and any number of acoustic receivers 420 as described above with reference to FIG. 2. The acoustic signals may include identification information in order to differentiate between different acoustic transceivers 420.

Transceiver 410 may be configured to communicate information with any number of sensors 430 as described above with reference to FIG. 1. In the illustrated embodiment, sensors 430a and 430n are configured to send information but not receive information, while sensor 430b is configured for two-way communication.

Transceiver 410 may be configured to communicate with any number of devices 440 as described above with reference to FIG. 1. In the illustrated embodiment, sensors 440a and 440n are configured to receive information but not send information, while sensor 430b is configured for two-way communication.

Acoustic transceiver 410 may be configured to communicate with multiple other devices at the same time. Acoustic transceiver 410 may also be configured to schedule communication with other devices (e.g., periodically, or in a particular order).

In the illustrated embodiment, acoustic transceiver 410 is coupled to survey equipment or other survey devices using a non-acoustic interface and allows transceivers 420, sensors 430, and/or devices 440 to communicate with the survey equipment via acoustic transceiver 410. In some embodiments, multiple acoustic transceivers may be interfaced to survey equipment or other survey devices using a non-acoustic interface. Thus, N acoustic transceiver may be configured to communicate with M survey devices. Various algorithms may be implemented for identifying transceivers and efficiently communicating with survey equipment. For example, when some acoustic transceivers are being used for ranging, other acoustic transceivers may be available for conveying other information.

Figure 5A:
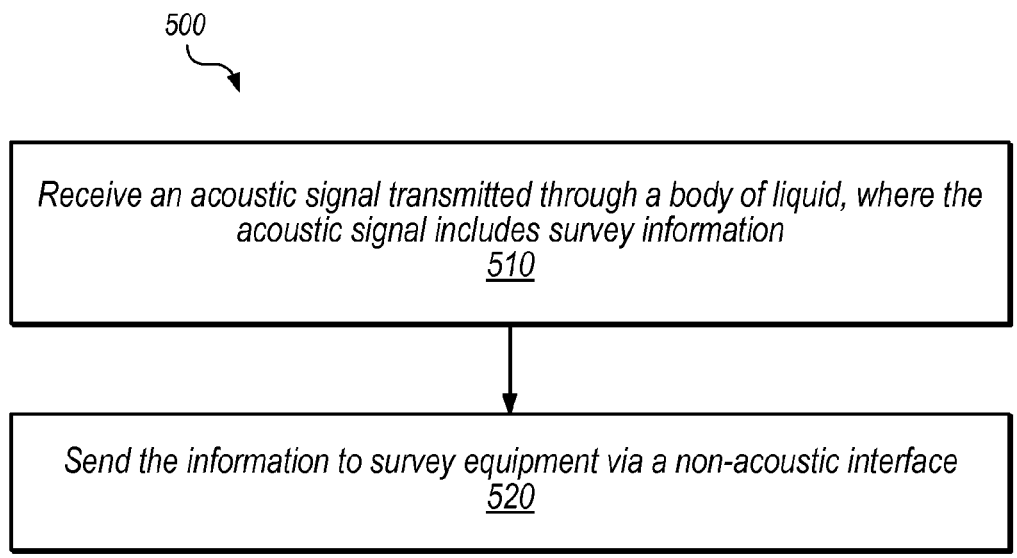
FIGS. 5A and 5B are flow diagram illustrating embodiments of methods for interfacing survey devices acoustically.

Referring now to FIG. 5A, a flow diagram illustrating one exemplary embodiment of a method 500 for interfacing survey devices acoustically is shown. The method shown in FIG. 5A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, an acoustic transducer in a survey system receives an acoustic signal transmitted through a body of water. The acoustic signal includes survey information. The information may include information gathered by survey sensors, and/or status information associated various survey devices, for example. A sensor may determine the information in response to a request from survey equipment on a survey vessel, for example. The acoustic signal may include an identifier of a survey device. Flow proceeds to block 520.

At block 520, the information is sent to survey equipment. For example, the acoustic transducer may send the information to survey equipment on a survey vessel via a communication interface in a streamer cable. The method may further include sending communication information from the survey equipment to a device that transmitted the acoustic signal via the acoustic transducer, using another acoustic signal. Flow ends at block 520.

Figure 5B:
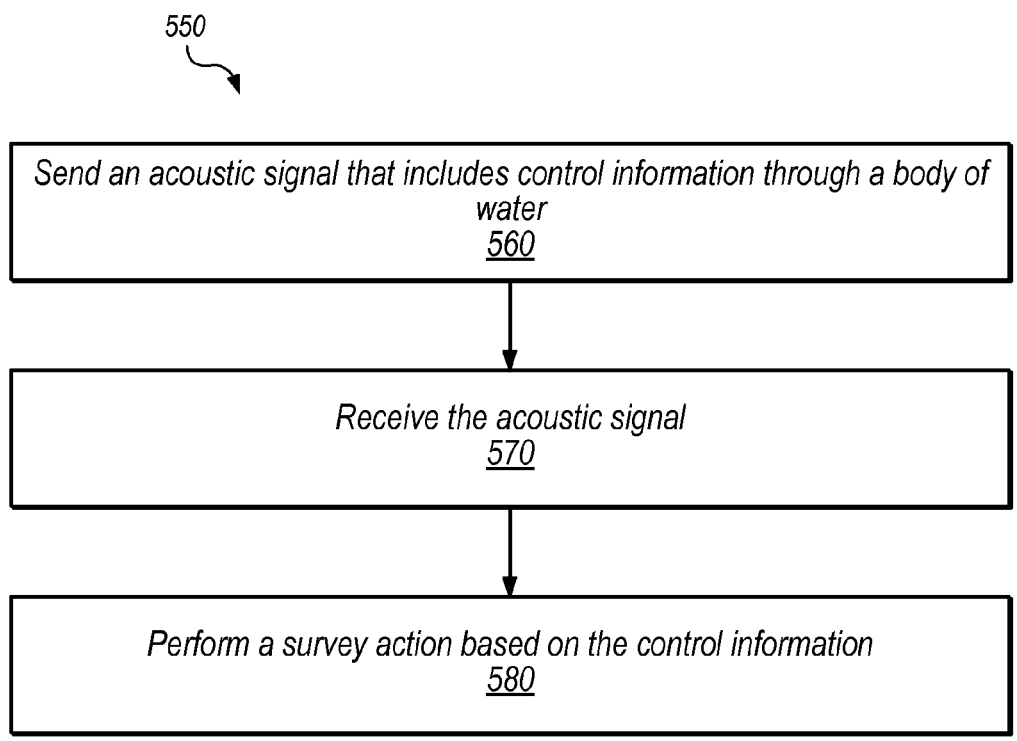

Referring now to FIG. 5B, a flow diagram illustrating one exemplary embodiment of a method 550 for interfacing survey devices acoustically is shown. The method shown in FIG. 5B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 560.

At block 560, a first acoustic transducer sends an acoustic signal through a body of water. In this embodiment, the acoustic signal includes control information. The control information may be generated by survey equipment, which may include a survey control system. Flow proceeds to block 570.

At block 570, a second acoustic transducer receives the acoustic signal. In this embodiment, the second acoustic transducer is coupled to a survey device. Flow proceeds to block 580.

At block 580, the survey device performs a survey action based on the control information. The survey action may include: acquiring data from a sensor, rotating a deflector, navigating to a desired position, entering a particular operational mode, reporting a current operational state, reporting an error, emitting a survey source signal, and updating device firmware. Flow ends at block 580.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a survey sensor configured to generate sensor data based on received signals, wherein the received signals are generated by a survey source during a survey and reflected by a subsea geophysical structure;
   a first acoustic transducer configured to receive the sensor data from the sensor and transmit the sensor data to a survey vessel by acoustically transmitting the sensor data to a second acoustic transducer, wherein the second acoustic transducer is coupled to a streamer towed behind the survey vessel and is configured to communicate with the survey vessel via the streamer;
   wherein the apparatus is configured to couple to a streamer towed by the survey vessel during the survey to generate and transmit the sensor data.

2. The apparatus of claim 1, wherein the survey sensor comprises at least one device selected from the group consisting of: a pressure sensor, a particle-motion sensor, a seismic sensor, and an electromagnetic sensor.

3. The apparatus of claim 1, wherein the first acoustic transducer is further configured to transmit the sensor data to a third acoustic transducer that is not directly coupled to the survey vessel.

4. The apparatus of claim 1, wherein the apparatus is configured to couple to the streamer in-line.

5. The apparatus of claim 1, wherein the first transducer is configured to receive control information from the survey vessel via the streamer cable and the second acoustic transducer, and wherein the apparatus is configured to perform a survey action in response to the control information.

6. The apparatus of claim 1, wherein the first acoustic transducer is configured to transmit the sensor data using phase-shift keying.

7. The apparatus of claim 1, wherein the apparatus is further configured to:
   transmit, using the first acoustic transducer, acoustic signals usable for determining range information between streamers to one or more other acoustic transducers coupled to one or more other streams.

8. A method, comprising
   receiving, by a first acoustic transducer in a survey system, an acoustic signal transmitted through a body of water, wherein the acoustic signal includes sensor information generated by a survey sensor coupled to a streamer towed behind a survey vessel, wherein the sensor information is generated based on received signals that are generated by a survey source during a survey and reflected by a subsea geophysical structure; and
   sending the sensor information from the first acoustic transducer to the survey vessel via a streamer coupled to the first acoustic transducer, wherein the sending is performed using a non-acoustic interface.

9. The method of claim 8, further comprising generating the sensor information and transmitting the sensor information from a second acoustic transducer coupled to the survey sensor to the first acoustic transducer.

10. The method of claim 8, wherein the sensor information includes at least one of: velocity information, pressure information, and electromagnetic information.

11. The method of claim 8, wherein the acoustic signal includes an identifier of the survey sensor.

12. The method of claim 8, further comprising:
    determining distance information corresponding to the distance between streamers based on acoustic communications between the first acoustic transducer and a second acoustic transducer that transmitted the sensor information.

13. The method of claim 8, further comprising
    acoustically transmitting, by the first acoustic transducer, control information to the survey sensor, wherein the control information is received by the first acoustic transducer via the coupled streamer.

14. A method, comprising:
    a seismic sensor generating sensor data based on received signals, wherein the signals are generated by a seismic source and reflected by a subsea geophysical structure, wherein the seismic sensor is coupled to a first streamer towed by a survey vessel;
    a first acoustic transducer receiving the sensor data from the seismic sensor and transmitting the sensor data to the survey vessel by acoustically transmitting the data to a second acoustic transducer, wherein the second acoustic transducer is coupled to a second streamer towed behind a survey vessel and is configured to communicate with the survey vessel via the streamer.

15. The method of claim 14, wherein the seismic sensor is not coupled to transmit data to the survey vessel via the first streamer during a time interval in which the transmitting is performed.

16. The method of claim 14, further comprising encoding the sensor data using at least one of: phase-shift keying, frequency-shift keying, and amplitude-shift keying.

17. The method of claim 14, further comprising determining a distance between the first and second streamers based on acoustic communications between the first and second acoustic transducers.

* * * * *